US008169676B2

(12) United States Patent
Przygodda et al.

(10) Patent No.: US 8,169,676 B2
(45) Date of Patent: May 1, 2012

(54) HOLOGRAPHIC STORAGE SYSTEM WITH MULTIPLE REFERENCE BEAMS

(75) Inventors: Frank Przygodda, Villingen-Schwenningen (DE); Joachim Knittel, Tuttlingen (DE)

(73) Assignee: Thomson Licensing, Issy-les-Moulineaux (FR)

( * ) Notice: Subject to any disclaimer, the term of this patent is extended or adjusted under 35 U.S.C. 154(b) by 503 days.

(21) Appl. No.: 12/381,686

(22) Filed: Mar. 16, 2009

(65) Prior Publication Data

US 2009/0237760 A1    Sep. 24, 2009

(30) Foreign Application Priority Data

Mar. 18, 2008 (EP) .................................... 08102721

(51) Int. Cl.
*G03H 1/10* (2006.01)
*G03H 1/12* (2006.01)
*G03H 1/28* (2006.01)

(52) U.S. Cl. ................................. 359/10; 359/11; 359/24
(58) Field of Classification Search ..................... 359/10, 359/24, 11

See application file for complete search history.

(56) References Cited

U.S. PATENT DOCUMENTS

| 3,529,083 | A | 9/1970 | Nelson et al. |
| 6,445,470 | B1 | 9/2002 | Jenkins et al. |
| 6,501,571 | B1 | 12/2002 | Wang et al. |

OTHER PUBLICATIONS

Search report Aug. 15, 2008.

*Primary Examiner* — Jade R Chwasz
(74) *Attorney, Agent, or Firm* — Myers Wolin, LLC

(57) ABSTRACT

An apparatus for reading from and/or writing to holographic storage media is described, and more specifically an apparatus for reading from and/or writing to holographic storage media with two or more reference beams that overlap inside the holographic storage medium for reading and/or writing a single hologram. The two or more reference beams are mutually incoherent during reading and/or writing.

19 Claims, 4 Drawing Sheets

# HOLOGRAPHIC STORAGE SYSTEM WITH MULTIPLE REFERENCE BEAMS

This application claims the benefit, under 35 U.S.C. §119 of EP Patent Application 08102721.1, filed 18 Mar. 2008.

FIELD OF THE INVENTION

The present invention relates to an apparatus for reading from and/or writing to holographic storage media, and more specifically to an apparatus for reading from and/or writing to holographic storage media with multiple reference beams.

BACKGROUND OF THE INVENTION

In holographic data storage digital data are stored by recording the interference pattern produced by the superposition of two coherent laser beams, where one beam, the so-called 'object beam', is modulated by a spatial light modulator and carries the information to be recorded. The second beam serves as a reference beam. The interference pattern leads to modifications of specific properties of the storage material, which depend on the local intensity of the interference pattern. Reading of a recorded hologram is performed by illuminating the hologram with the reference beam using the same conditions as during recording. This results in the reconstruction of the recorded object beam.

One advantage of holographic data storage is an increased data capacity. Contrary to conventional optical storage media, the volume of the holographic storage medium is used for storing information, not just a few layers. One further advantage of holographic data storage is the possibility to store multiple data in the same volume, e.g. by changing the angle between the two beams or by using shift multiplexing, etc. In the page-oriented holographic storage approach, instead of storing single bits, data are stored as data pages. Typically a data page consists of a matrix of light-dark-patterns, i.e. a two dimensional binary array or an array of grey values, which code multiple bits. Data pages can also be produced by an array of phase shifting elements. The use of data pages allows to achieve increased data rates in addition to the increased storage density. The data page is imprinted onto the object beam by the spatial light modulator (SLM) and detected with a detector array.

To make efficient use of the holographic storage material, a good overlap between the object beam and the reference beam is necessary. A good overlap with the object beam means that the entire or at least a significant part of the object beam is superimposed by the reference beam inside the holographic storage medium. In order to improve this overlap, it has been proposed to use two or more reference beams during recording or reading.

For example, EP 1 624 451 discloses a coaxial holographic storage system, where a plurality of reference beams are arranged around the object beam. According to this solution the object beam and the reference beams are coupled in and out at the object plane and the image plane, respectively. This arrangement is a so-called split aperture arrangement, because the aperture of the Fourier objective is split into an object part and a reference part.

Though the use of multiple reference beams allows to improve the overlap with the object beam, it has been found that during recording it becomes necessary to reduce the intensity of the reference beams to avoid local saturation of the holographic material. This leads to an effective reduction of the M# number, or in other words a reduction of the number of holograms that can be stored in the holographic storage medium.

SUMMARY OF THE INVENTION

It is an object of the invention to propose an apparatus for reading from and/or writing to a holographic storage medium with two or more reference beams, which overcomes the above problem.

According to the invention, this object is achieved by an apparatus for reading from and/or writing to a holographic storage medium, with two or more reference beams that overlap inside the holographic storage medium for reading and/or writing a single hologram, and an object beam or a reconstructed object beam, in which the reference beams are mutually incoherent during reading and/or writing.

Similarly, a method for reading from and/or writing to a holographic storage medium using two or more reference beams, which overlap inside the holographic storage medium for reading and/or writing a single hologram, has the step of generating mutually incoherent reference beams for reading and/or writing.

For writing a hologram the reference beams need to be coherent with the object beam. Otherwise no interference pattern is produced, which is the basis of holographic storage. In the prior art solutions using multiple reference beams, the multiple reference beams are generated in such way that they are mutually coherent. When coherent reference beams are used, the overlap of the reference beams produces an interference pattern in the region of overlap. This interference pattern leads to a spatially varying intensity distribution. For example, if two beams overlap, the intensity at the peaks of the interference pattern is up to two times higher than the average intensity. If three overlapping reference beams are used, the intensity at the peaks of the interference pattern is up to three times higher than the average intensity. The solution according to the invention has the advantage that it is no longer necessary to reduce the intensity of the reference beams to avoid local saturation of the holographic material. Consequently, the M# number is maintained and the number of holograms that can be stored in the holographic storage medium does not need to be reduced.

Preferably, a switching element alternatingly directs a single one of the two or more reference beams towards the holographic storage medium. In this way reference beams are essentially switched on one by one, whereas the object beam is switched on all the time. This ensures that each single reference beam interferes with the object beam, but not with the other lo reference beams. During reading the holographic medium is preferably illuminated with all reference beams simultaneously. Alternatively, the reference beams are switched one by one. The array detector then integrates the whole time during the switching. In this case the detector signal is the incoherent sum of the reconstructed object beams. It is also possible to take independent images with each reference beam and to add them up by software image processing.

Advantageously, the switching element is a beam steering element or a fiber-optic splitter. This allows to switch the entire energy that is available for the reference beams between the individual reference beams. As a consequence the recording time does not change. Exemplary beam steering elements are a flap mirror or a switchable grating.

Alternatively, the switching element is a beam block, e.g. a shutter or an SLM-like optical device. Though in this case the energy of the blocked reference beams is lost, which leads to higher laser power requirements and/or an increased recording time, this solution is easier to implement.

Favorably, for generating the two or more mutually incoherent reference beams a first delay element is provided for delaying the two or more reference beams relative to each other in such way that the optical path difference between the two or more reference beams is larger than the coherence length of the two or more reference beams. Typical examples of such a delay element are a fiber-optic delay line or an optical setup consisting of mirrors. This solution allows to simultaneously switch on all the reference beams without the disadvantage of destructive interference of the reconstructed object beams. No switchable elements are needed in this case for switching the reference beams. The solution is preferably applied when only two reference beams are used. It is then sufficient to ensure that each of the two reference beams still is coherent with the object beam, i.e. the optical path difference between the two reference beams may not exceed twice the coherence length. Preferably, the optical path difference between the two reference beams is only slightly larger than the coherence length. A second delay element is preferably provided for delaying the object beam in such way that the optical path difference between the object beam and each of the two reference beams is approximately one half the coherence length of the two reference beams. Of course, if the optical path difference between the two reference beams is substantially larger than the coherence length, the optical path difference between the object beam and each of the two reference beams needs to be larger than one half the coherence length. When the optical path difference between the object beam and each of the two reference beams does not exceed the coherence length, it is ensured that that the object beam is at least partly coherent with both reference beams.

A further possibility in this context is to switch the delay line of the object beam sequentially in time in such way that the optical path difference is zero with respect to each of the multiple reference beams.

Still a further solution for generating the two or more mutually incoherent reference beams is to provide independent light sources for generating the two or more reference beams. Though this solution is more costly, it is very simple to realize.

Of course, it is likewise possible to combine two or more of the above solutions for generating mutually incoherent reference beams. In case of four reference beams, for example, two of the reference beams are preferably made incoherent using a delay line, whereas the other two reference beams are made incoherent by switching.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERRED EMBODIMENTS

Figure 1:
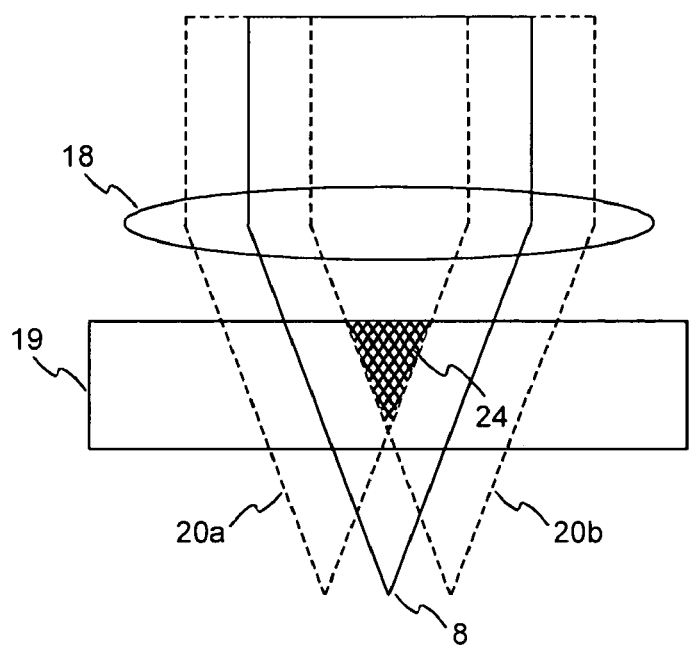
FIG. 1 illustrates an exemplary beam arrangement with two reference beams.

A simplified example of a known beam arrangement with two coherent reference beams 20a, 20b is shown in FIG. 1. The reference beams 20a, 20b and an object beam 8 are focused into the holographic storage medium 19 by an objective lens 18. In this arrangement the two reference beams 20a, 20b overlap in a central region 24. As described before, during writing the overlap of the reference beams 20a, 20b causes an interference pattern, which may lead to a local saturation of the holographic material.

Figure 2:
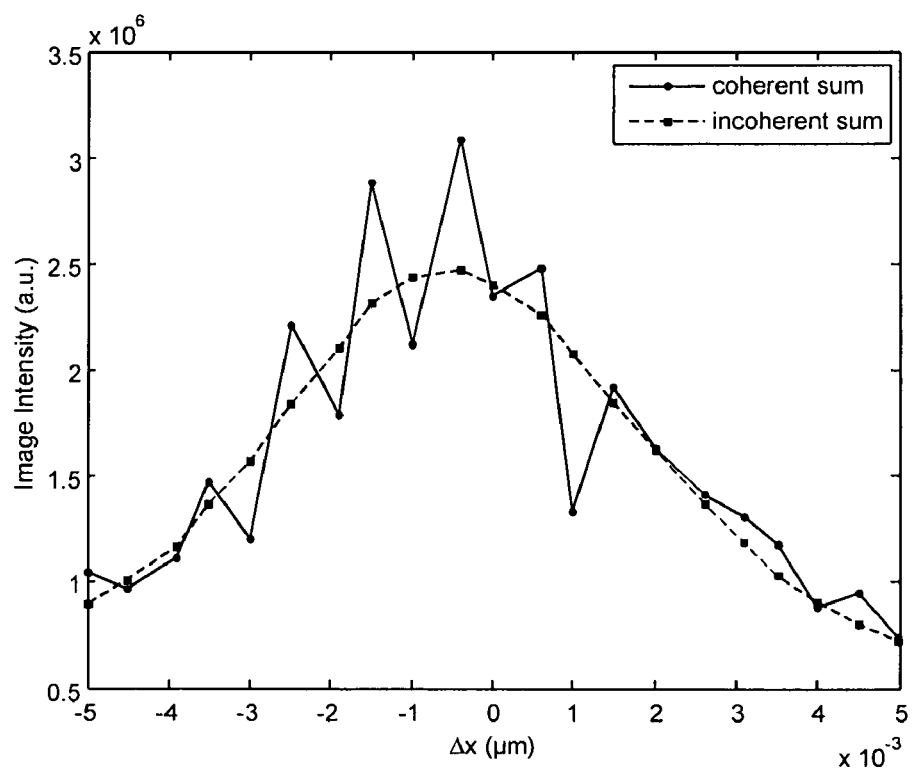
FIG. 2 shows measurements of the shift selectivity of a hologram read-out with two coherent and with two incoherent reference beams.

The overlap of multiple coherent reference beams 20a, 20b also causes disturbing effects during the reading operation. FIG. 2 shows measurements of the shift selectivity of a hologram written with the beam arrangement described above. The solid curve shows the intensity of a reconstructed data page in case of reading with two coherent reference beams 20a, 20b. The curve exhibits characteristic intensity fluctuations when shifting the material out of the nominal position, where the addressed hologram is located. This effect arises from the hologram region, where two or more reference beams 20a, 20b have interfered with the object beam 8. Here, several sub-holograms were written, each with one of the reference beams 20a, 20b. The intensity fluctuations are not dependent on whether the reference beams 20a, 20b were coherent or incoherent during writing. If the hologram is read, each reference beam 20a, 20b reconstructs an object beam 8 which is imaged onto the same location of the detector 23.

Figure 3:
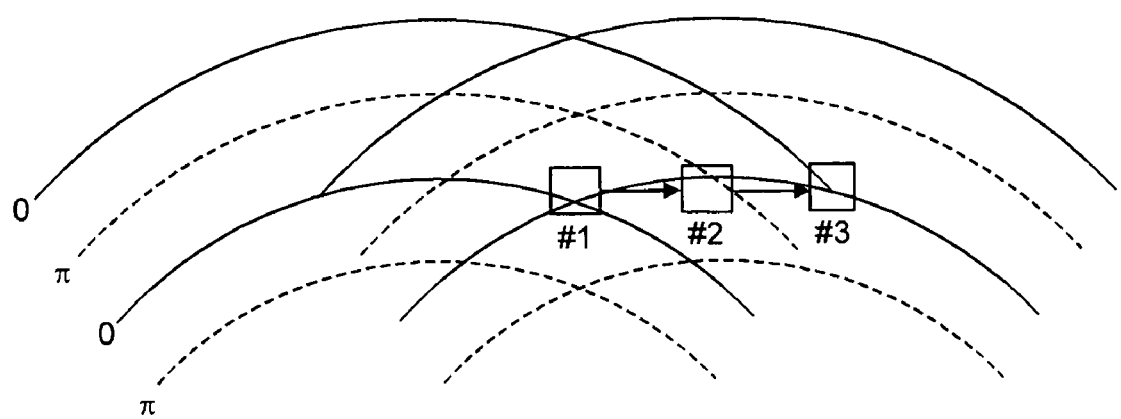
FIG. 3 depicts a schematic view of the reference beam wavefronts in the overlapping region.

FIG. 3 shows a schematic view of two reference beam wavefronts in the central hologram region 24, where the beams overlap. Box #1 indicates a region where both reference beams 20a, 20b have the same phase. Therefore, the two reconstructed object beams resulting from diffraction at the interference patterns in this region are in phase, too. If the medium is shifted with respect to the nominal position, the region comes to a position (box #2) where both reference beams 20a, 20b have a phase shift of $\pi$. The reconstructed object beams emerging from the region have a phase shift of $\pi$, too. This causes destructive interference of both reconstructed object beams, which results in a lower intensity. If the medium is shifted further, it again reaches a position where the reference beam wavefronts are in phase, so that the reconstructed object beams are in phase again (box #3). In other words, the changing phase relation between the two reference beam wavefronts during shifting is responsible for the intensity fluctuation that is visible in FIG. 2.

The intensity fluctuations disturb the reading process, as a small displacement from the nominal position results in a much lower intensity of the reconstructed object beam. The disturbing effect is avoided when the reference beams 20a, 20b are incoherent with respect to each other. The dashed line in FIG. 2 shows the shift selectivity when the hologram is read with mutually incoherent reference beams 20a, 20b. No fluctuations occur.

Figure 4:
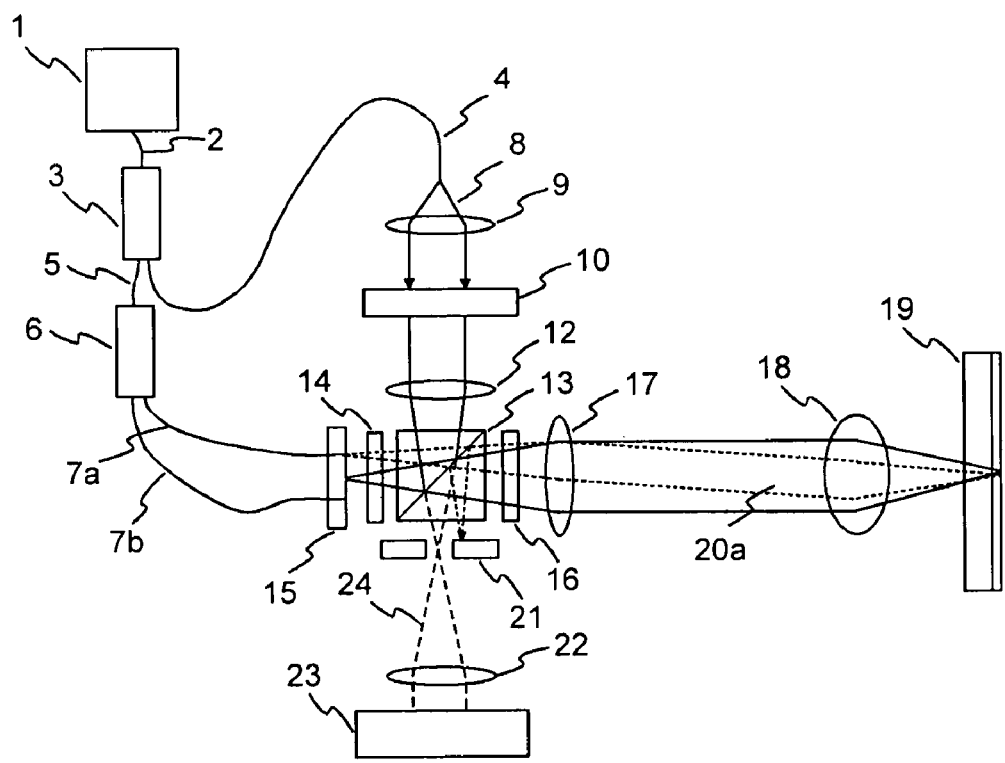
FIG. 4 shows an apparatus according to the invention for reading from and/or writing to holographic storage media.

In FIG. 4 an exemplary apparatus according to the invention for reading from and/or writing to holographic storage media is shown schematically. For simplicity the servo system is omitted. In addition, no reconstructed object beam is shown. The light emitted by a laser 1 is transmitted by an optical fiber 2 to a first fiber splitter module 3, which distributes the laser radiation to an optical fiber 4 for the object beam 8 and an optical fiber 5 leading to a switchable fiber-optic splitter 6. The switchable fiber-optic splitter 6 directs the laser radiation into a selected one of a pair of optical fibers 7a, 7b for generating two mutually incoherent reference beams 20a, 20b. Of course, the invention is not limited to two reference beams. It is likewise possible to use three or more reference beams. In addition, the object beam 8 and the reference beams 20a, 20b can likewise be coupled into the optical path without using an optical fibers.

Figure 5:
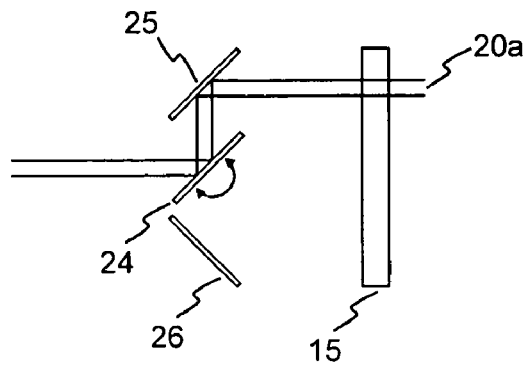
FIG. 5 illustrates the generation of mutually incoherent reference beams using a flap mirror.

During writing the object beam 8 is collimated by a first lens 9 and passed through a spatial light modulator 10. The modulated object beam 8 is focused by a second lens 12 through a polarizing beam splitter 13 and a first quarter wave plate 14 onto a reference beam coupler 15. The reference beam coupler 15 will be discussed in some more detail below with reference to FIG. 5. The object beam 8 is reflected by the reference beam coupler 15 and passes again through the quarter wave plate 14. Consequently, it is transmitted by the polarizing beam splitter 13. Subsequently the object beam 8 passes a second quarter wave plate 16 and is collimated by a third lens 17, before it is focused into a hologram layer of a reflection type holographic storage medium 19 by a fourth lens 18.

During reading a reconstructed object beam 24 is reflected by a reflective layer of the holographic storage medium 19. It is then collimated by the fourth lens 18 and imaged onto an array detector 23 by the third lens 17 via the second quarter wave plate 16, a pin-hole 21 and a fifth lens 22. The pin-hole 21 Fourier filters the reconstructed object beam 24.

In the following the reference beam path is described. For simplicity only one reference beam 20a is depicted. The reference beam 20a is coupled into the optical path by the reference beam coupler 15. After passing the first quarter wave plate 14, the polarizing beam splitter 13 and the second quarter wave plate 16, the reference beam 20a is focused into the hologram layer of the holographic storage medium 19 by the third lens 17 and the fourth lens 18. The reflected reference beam passes through the fourth lens 18, the third lens 17 and the second quarter wave plate 16. It is then directed towards the pin-hole 21 by the polarizing beam splitter 13. As the reference beam 20a is not arranged on the optical axis of the optical path, the reflected reference beam is blocked by the pin-hole 21 and does not reach the array detector 23.

In an advantageous refinement of the apparatus the switchable fiber-optic splitter 6, the pair of optical fibers 7a, 7b, and the reference beam coupler 15 are integrated into a single element using waveguides and an integrated optics approach to is further miniaturize the system.

Figure 6:
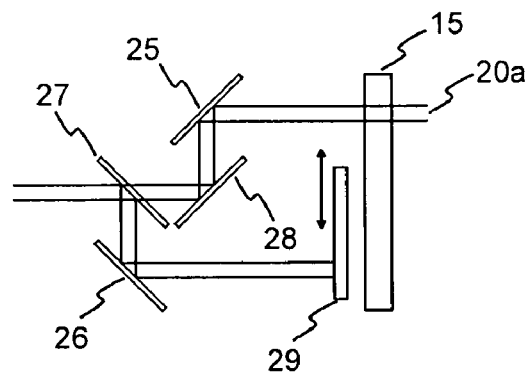
FIG. 6 depicts the generation of mutually incoherent reference beams using a shutter.

Apart from a switchable fiber-optic splitter 6 other solutions are available for generating mutually incoherent reference beams 20a, 20b. For example, a flap mirror 24 or another beam steering element may couple a single reference beam into different optical paths, if necessary in combination with other optical elements 25, 26. This solution is illustrated schematically in FIG. 5. Likewise, as depicted in FIG. 6, a shutter 29 may be used for alternatingly blocking all but one of a plurality of reference beams that are generated simultaneously. e.g. with the help of a semi-transparent mirror 27 and additional mirrors 25, 26, 28. In all these cases at any time only a single one of the two or more reference beams 20a, 20b is directed towards the holographic storage medium 19.

Another way is to make the reference beams 20a, 20b incoherent by an additional optical device. For example, a delay line may be provided, which extends the optical paths of one reference beam 20a with respect to the other reference beam 20b such that the optical path difference is larger than the coherence length of the laser light. For this purpose a fiber-optic delay line or a delay line consisting of mirrors is preferably used. In the arrangement of FIG. 4, this could be achieved by adapting the lengths of the optical fibers 7a, 7b. As a consequence the reference beams 20a, 20b are mutually incoherent. Read-out of the hologram with this configuration prevents for disturbances of the reconstructed object beams by destructive interference. In this case both reference beams 20a, 20b can be used for hologram read-out at the same time.

When delay lines are used for generating the incoherent reference beams 20a, 20b, for writing an additional delay element is preferably provided for delaying the object beam 8 in such way that the optical path difference between the object beam 8 and each of the reference beams 20a, 20b is equal to or larger than one half the coherence length of the two or more reference beams 20a, 20b such that the object beam 8 is coherent with both reference beams 20a, 20b. Again, in the arrangement of FIG. 4 the length of the optical fiber 4 this could be adapted for this purpose.

Figure 7:
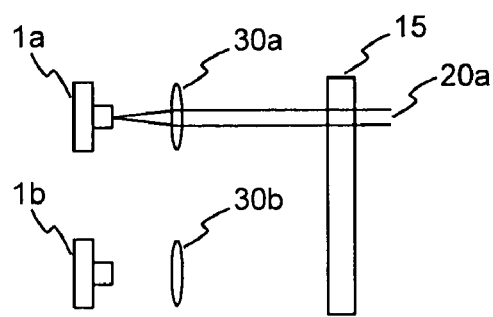
FIG. 7 illustrates the generation of mutually incoherent reference beams using independent light sources.

To avoid disturbances of the reconstructed object beams by destructive interference during read-out the reference beams 20a, 20b can also be generated by two independent light sources 1', 1". This ensures the incoherence of the reference beams 20a, 20b with respect to each other. An exemplary arrangement using this solution is depicted schematically in FIG. 7. In this arrangement independent collimating lenses 30a, 30b are provided as well.

Figure 8:
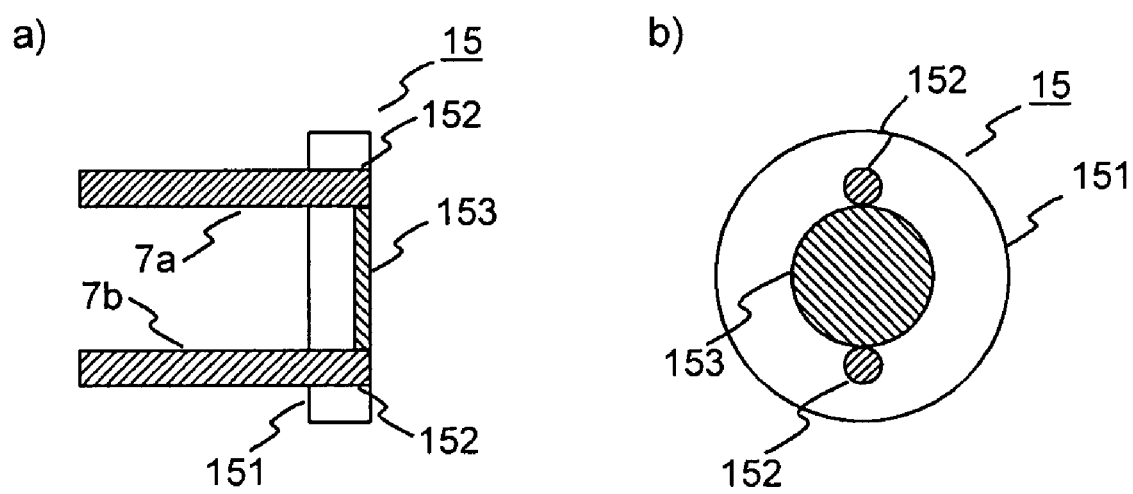
FIG. 8 depicts a reference beam coupler used in the apparatus of FIG. 4.

In FIG. 8 the reference beam coupler 15 is illustrated schematically. The reference beam coupler 15 consists of a glass substrate 151 with two or more holes 152. Optical fibers 7, preferentially polarization-maintaining single-mode fibers, are mounted into these holes 152. Furthermore a reflective coating 153 is arranged on the glass substrate 151. The coating 153 is used to reflect and Fourier filter the object beam 8, whereas the optical fibers 7 are used to generate the reference beams 20a, 20b.

What is claimed is:

1. An apparatus for writing a hologram carrying a data page to a holographic storage medium, the apparatus comprising:
    an object beam carrying the data page,
    a first reference beam,
    at least a second reference beam, and
    an objective lens for focusing the object beam, the first reference beam, and the second reference beam into a hologram layer of the holographic storage medium,
    wherein the first and the second reference beams both overlap with the object beam in order to write a single hologram, the first and the second reference beams having a region of overlap, and
    wherein the first and the second reference beams are mutually incoherent during writing.

2. The apparatus according to claim 1, further comprising a switching element for alternatingly directing a single one of the reference beams towards the holographic storage medium.

3. The apparatus according to claim 2, wherein the switching element is one of a beam block, a beam steering element or a fiber-optic splitter.

4. The apparatus according to claim 1, further comprising a first delay element for delaying the reference beams relative to each other in such way that an optical path difference between the reference beams is larger than a coherence length of the reference beams.

5. The apparatus according to claim 4, wherein the first delay element is a fiber-optic delay line or an optical setup consisting of mirrors.

6. The apparatus according to claim 4, wherein the apparatus comprises two reference beams and a second delay element for delaying the object beam in such way that an optical path difference between the object beam and each of the two reference beams is equal to or larger than one half of a coherence length of the two reference beams.

7. The apparatus according to claim 4, further comprising a second delay element for delaying the object beam sequentially in such way that an optical path difference between the object beam and each of the reference beams is essentially zero.

8. The apparatus according to claim 1, further comprising independent light sources for generating the reference beams.

9. A method for reading a hologram carrying a data page from or writing a hologram carrying a data page to a holographic storage medium using a first and at least a second reference beam, which overlap at least partially inside the holographic storage medium for reading or writing a single hologram, the method comprising:
generating the first reference beam;
generating at least the second reference beam, wherein the first reference beam and the second reference beam are mutually incoherent; and
simultaneously or alternatingly focusing the first reference beam and the second reference beam onto the hologram for reading the hologram; or
simultaneously or alternatingly focusing the first reference beam and the second reference beam and concurrently an object beam carrying the data page into a hologram layer of the holographic storage medium for writing the hologram.

10. The method according to claim 9, wherein the mutually incoherent reference beams are generated by alternatingly directing a single one of the reference beams towards the holographic storage medium.

11. The method according to claim 9, wherein the mutually incoherent reference beams are generated by delaying the reference beams relative to each other in such way that an optical path difference between the reference beams is equal to or larger than a coherence length of the reference beams.

12. The method according to claim 11, further comprising delaying the object beam sequentially in such way that an optical path difference between the object beam and each of the reference beams is essentially zero.

13. The method according to claim 9, wherein the mutually incoherent reference beams are generated by independent light sources.

14. An apparatus for reading a hologram carrying a data page from a holographic storage medium, the apparatus comprising a first reference beam, at least a second reference beam, and an objective lens for focusing the first reference beam and the second reference beam into a hologram layer of the holographic storage medium, the first reference beam and the second reference beam in conjunction being adapted to read a single hologram, the first and the second reference beam having a region of overlap, wherein the first reference beam and the second reference beam are mutually incoherent during reading.

15. The apparatus according to claim 14, further comprising a switching element for alternatingly directing a single one of the reference beams towards the holographic storage medium.

16. The apparatus according to claim 15, wherein the switching element is one of a beam block, a beam steering element or a fiber-optic splitter.

17. The apparatus according to claim 14, further comprising a first delay element for delaying the reference beams relative to each other in such way that an optical path difference between the reference beams is larger than a coherence length of the reference beams.

18. The apparatus according to claim 17, wherein the first delay element is a fiber-optic delay line or an optical setup consisting of mirrors.

19. The apparatus according to claim 14, further comprising independent light sources for generating the reference beams.

* * * * *